(12) United States Patent
Nakamura

(10) Patent No.: US 7,484,616 B2
(45) Date of Patent: Feb. 3, 2009

(54) TRANSPORTATION FACILITY FOR TRAVELING BODY FOR TRANSPORTATION

(75) Inventor: Jiro Nakamura, Osaka (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 11/958,470

(22) Filed: Dec. 18, 2007

(65) Prior Publication Data
US 2008/0135382 A1      Jun. 12, 2008

Related U.S. Application Data

(63) Continuation of application No. PCT/JP2006/314390, filed on Jul. 20, 2006.

(30) Foreign Application Priority Data

Jul. 25, 2005      (JP) ............................. 2005-213748

(51) Int. Cl.
*B65G 47/34*      (2006.01)
(52) U.S. Cl. ............... 198/465.4; 198/345.3; 104/172.2
(58) Field of Classification Search ............. 198/345.1, 198/345.2, 345.3, 465.4, 678.1; 104/89, 104/93, 172.2, 172.3, 172.4
See application file for complete search history.

(56) References Cited

U.S. PATENT DOCUMENTS 4,462,315 A * 7/1984 Wakabayashi ........... 104/172.4
5,364,469 A * 11/1994 Wakabayashi ........... 198/465.4
5,996,771 A * 12/1999 Estes ....................... 198/465.4
6,814,219 B2 * 11/2004 Shimizu ................... 198/465.4
6,902,051 B2 * 6/2005 Dehne et al. ............. 198/346.3
6,959,801 B2 * 11/2005 Shibata et al. ........... 198/345.3
6,966,431 B2 * 11/2005 Jaynes et al. ............. 198/465.4
7,225,914 B2 * 6/2007 Nakamura et al. ....... 198/465.4

FOREIGN PATENT DOCUMENTS

JP      H04-5581      1/1995
JP      H07-157073    6/1995

* cited by examiner

*Primary Examiner*—James R Bidwell
(74) *Attorney, Agent, or Firm*—Schweitzer Cornman Gross & Bondell LLP

(57) ABSTRACT

A transportation facility in which an object transported while being suspended from a hanger such as a trolley conveyor is transferred on to a carriage of a carriage-type transportation device for a certain section of a route. At the start point, there is an object receiving means at the under side of a traveling route of a traveling body. An object support device is lifted relative to the hanger of the traveling body and the object receiving means is caused to receive the object (W) from the hanger. At the end of the transportation, an object return means is provided for lowering the object support device relative to the hanger to transfer the object to the hanger. In the transportation route, the traveling body is switched to a state in which drive is released and a hanger engagement means is engaged with the hanger so that the traveling body can be pulled and moved by the carriage.

11 Claims, 9 Drawing Sheets

US 7,484,616 B2

TRANSPORTATION FACILITY FOR TRAVELING BODY FOR TRANSPORTATION

RELATED APPLICATIONS

This is a continuation of International Application No. PCT/JP2006/314390, filed Jul. 20, 2006.

TECHNICAL FIELD

The present invention relates to a transportation facility in which an object transported while being suspended from a hanger provided on a trolley conveyor or a self-propelled train is transferred onto a carriage of a carriage-type transportation device only for a certain section of a route.

BACKGROUND OF THE INVENTION

For example, in an automobile assembly line, a work of assembling an engine and a door, etc., to a vehicle body transported while being suspended from a hanger provided on a traveling body of a trolley conveyor or a self-propelled train is performed, and in this case, it is known that such a work of assembling parts to a vehicle body supported by the hanger is performed on a carriage of a carriage-type transportation device. As a transportation facility available in this case, for example, as described in Patent Document 1 (defined below), a transportation facility is known in which a traveling body (traveling body of a trolley conveyor driven by a pusher) having a hanger for supporting a vehicle body is made to travel in synch with a transportation device on the floor side and a work of assembling parts to the vehicle body transported from a position on the transportation device on the floor side while being suspended from the hanger, and as described in Patent Document 2, a transportation facility is known in which an object transported while being suspended from a hanger is transferred onto a carriage of a carriage-type transportation device that travels in synch with a traveling body of a trolley conveyer or a self-propelled train having this hanger, and after finishing a work on the carriage, the vehicle body on the carriage is returned to the hanger again.

Patent document 1: Japanese Published Examined Patent Application No. H04-5581.
Patent document 2: Japanese Published Unexamined Patent Application No. H07-157073.

DISCLOSURE OF THE INVENTION

However, in the above-described conventionally known transportation facilities, until the work is completed, the object suspending transportation device (a traveling body of a trolley conveyor or a self-propelled train) from which an object such as a vehicle body is suspended to be transported and a carriage-type transportation device (carriage) which a worker gets on and performs the work must be driven in synch with each other, and not only does this require high-level techniques for controlling these transportation devices, but also the work of assembling parts to a location where the hanger for suspending the object obstructs the work is impossible when the transportation facility described in Patent document 1 is used.

SUMMARY OF THE INVENTION

An object of the present invention is to provide a transportation facility which can solve the conventional problem described above, and a transportation facility according to a first aspect of the invention includes, as described by attaching the reference numerals in parentheses used in the following embodiment, an object suspending transportation device (P&F trolley conveyor (1)), a carriage-type transportation device (11), an object receiving means (14), and an object return means (15), where the object suspending transportation device (P&F trolley conveyor (1)) includes traveling bodies (5) provided with object support hangers (8), and in a traveling route of the traveling bodies (5), a drive section (D) in which the traveling bodies (5) are forcibly made to travel and a drive release section (F) in which the traveling bodies (5) are made freely movable are provided, the carriage-type transportation device (11) includes a carriage (16) capable of traveling along the traveling route at the under side of the drive release section (F) of the traveling route of the traveling body (5), and object support device (19) is provided on the carriage (16), and the object receiving means (14) transfers an object (W) from the hanger (8) onto the object support devices (19) by lifting the object support devices (19) relative to the hanger (8) of the traveling body (5) at the start point of transportation of the carriage-type transportation device (11), and the object return means (15) transfers the object (W) from the object support devices (19) to the hanger (8) by lowering the object support devices (19) relative to the hanger (8) of the traveling body (5) at the end point of transportation of carriage-type transportation device (11), wherein The object support hanger (8) of the traveling body (5) of the object suspending transportation device (P&F trolley conveyor (1)) is provided with an engaged portion (42a), and a carriage (16) of the carriage-type transportation device (11) is provided with a hanger engagement means (20) which freely engages with and disengages from the engaged portion (42a) of the hanger (8), and in the transportation route (12) of the carriage-type transportation device (11), the hanger engagement means (20) engages with the engaged portion (42a) of the hanger (8), and the traveling body (5) of the object suspending transportation device (P&F trolley conveyor (1)) switched into a drive released state is pulled and moved by the carriage (16) via the hanger (8).

When carrying out the present invention constructed as described above, the object suspending transportation device may have an object support hanger (8) suspended on a self-propelled train which can be turned into a drive released state in which it can freely move forward and rearward in a specific section although it has a traveling drive means, however, it is also possible that, as described in a second aspect, the object suspending transportation device includes a trolley conveyor (1) that propels a traveling body (5) by a pusher that moves along a traveling route of the traveling body (5), and in the drive releasing section (F), the traveling body (5) of the trolley conveyor (1) is separated from the pusher and switched into a drive released state.

The object receiving means (14) and the object return means (15) can be realized by a construction in which object support devices (19) are lifted and lowered with respect to the carriage (16), however, they can also be realized as described in a third aspect by elevating guide rails (25a, 29a) for elevating and lowering the carriage (15) itself.

When a work area (Wa) in which a work of assembling parts to an object (W) transferred from the hanger (8) onto the carriage (16) (object support devices (19)) overlaps the hanger (8), that is, when the hanger (8) separated from the object (W) obstructs the work, the hanger (8) and the object (W) on the carriage (16) are moved relative to each other by a predetermined distance in the front and rear direction, however, in this case, as described in a fourth aspect, the hanger engagement means (20) is provided at a position that corresponds to the engaged portion (42a) on the hanger (8) side when, at a start point of transportation of the carriage-type transportation device (11), the object support devices (19) that received the object (W) from the hanger (8) and this hanger (8) move relative to each other by a predetermined distance in the front and rear direction, and at an end point of transportation of the carriage-type transportation device (11), the object support devices (19) for supporting the object (W) and the hanger (8) are returned to the original opposed positions in the front and rear direction, and then the object return means (15) is operated. The relative forward and rearward movements of the object support devices (19) and the hanger (8) at the start point and the end point of transportation of the carriage-type transportation device (11) are realized by, for example, moving the carriage (16) itself in the front and rear direction as described in a fifth aspect, and in addition, these movements can also be realized by moving the object support devices (19) on the carriage (16) in the front and rear direction with respect to the carriage (16) or moving the hanger (8) (the traveling body (5) of the trolley conveyor (1) having this hanger (8) or a self-propelled train having this hanger (8)) in the front and rear direction.

The carriage-type transportation device (11) may use a self-propelled train as described above, however, when it is constructed so that a carriage (16) that cannot travel by itself is propelled by a carriage drive means (friction drive means (21)) disposed on a carriage traveling route side, as described in a sixth aspect, the object receiving means (14) is provided with a carriage sending-out means (carriage lead-in and sending-out means (27)) which sends the carriage (16) toward the transportation route (12) side and a carriage feeder (28) which moves the supported carriage (16) in the front and rear direction to a position at which the hanger engagement means (20) corresponds to the engaged portion (42a) of the hanger (8), and the object return means (15) is provided with a carriage lead-in means (carriage lead-in and sending-out means (31)) which leads-in the carriage (16) sent from the transportation route (12) to a predetermined position, and a carriage feeder (32) which moves and returns the carriage (16) in the front and rear direction so that the supported object (W) and the hanger (8) return to the relative positions in the front and rear direction. In this case, as described in a seventh aspect, the carriage feeder (28, 32) includes a pair of front and rear opening and closing gripping pieces (56a, 56b) for gripping a gripped portion (55) provided on the carriage (16) from the front and rear sides, an opening and closing drive means (57) for the opening and closing gripping pieces (56a and 56b), and a moving drive means (58) which reciprocates the opening and closing gripping pieces (56a, 56b) in the front and rear direction.

The hanger of the object suspending transportation device (trolley conveyor (1)) may be constructed in any way as long as an object supported by the hanger (8) can be received by the object support devices (19) on the carriage (16) side from below, however, when a general hanger as a vehicle body supporting hanger to be used in an automobile assembly line, that is, a hanger having a pair of left and right hanger arms (10a and 10b) that open and close in the left and right direction is used, as described in an eighth aspect, the hanger engagement means (20) includes a pair of left and right engagement devices (34a and 34b) engageable with engaged portions (42a and 42b) provided on the respective left and right hanger arms (10a and 10b), and one engagement device position switching means (35a) or (35b) which makes the pair of left and right engagement devices (34a and 34b) perform engagement and disengagement while interlocking these with each other. In this case, as described in a ninth aspect, the pair of left and right engagement devices (34a and 34b) are urged and held at upper positions at which they engage with the engaged portions (42a and 42b) by springs (40a and 40b), and cam follower rollers (39a and 39b) which elevate and lower by interlocking the respective engagement devices (34a and 34b) are provided on the carriage (16) side, and the engagement device position switching means (35a) or (35b) can include cam rails (52a and 52b) attached to the object receiving means (14) and the object return means (15), respectively, so as to engage with the cam follower rollers (39a and 39b) on the carriage (16) side when the carriage (16) is at the position of the object receiving means (14) and the object return means (15), and a cam rail drive means (cylinder unit (54)) for elevating and lowering these cam rails (52a and 52b). Furthermore, in this case, as described in a tenth aspect, the pair of left and right engagement devices (34a and 34b) are provided on outer ends of the pair of left and right seesaw moving bodies (37a and 37b) arranged sideways and have fulcrums at their middle points, and can interlock and join elevating bodies (38a and 38b) to the inner ends of the seesaw moving bodies (37a and 37b) and can axially support the cam follower rollers (39a and 39b) on lower ends of the elevating bodies (38a and 38b).

When the hanger engagement means (20) includes an engagement device (34a) that can vertically engage with and disengage from an engaged portion (42a) provided on the hanger (8), and an engagement device position switching means (35a) or (35b) that elevates and lowers the engagement device (34b), as described in an eleventh aspect, the engagement device (34a) includes a pair of front and rear engaging portions (43a and 43b) sandwiching the engaged portion (42a), and between the pair of front and rear engaging portions (43a and 43b), the rear engaging portion (43b) that pushes the engaged portion (42a) from the rear side is made movable forward and rearward in a predetermined range and urged and held at a front predetermined position by the spring (47), and a sensor (51) for detecting the rearward movement of the rear engaging portion (43b) against the spring (47) can also be provided.

According to the transportation facility of the present invention described in the first aspect, a carriage-type transportation device is installed on a floor side of a section in which a work of assembling parts to an object transported while being suspended from an object support hanger of an object suspending transportation device, and in a state in which a traveling body (hanger) of the object suspending transportation device is stopped at a predetermined position corresponding to a start point of transportation of this carriage-type transportation device, the object receiving means disposed at this start point of transportation is operated, whereby the object supported by the hanger is transferred onto the carriage of the carriage-type transportation device, and the object can be transported while being supported by object support devices of the carriage to an end point of transportation of the carriage-type transportation device, so that the work of assembling parts to the object can be easily performed on the carriage, and in this case, an empty hanger that had supported the object is integrated with the carriage by the hanger engagement means of the carriage and the traveling body (hanger) of the object suspending transportation device can be pulled to travel via the empty hanger by means of traveling of the carriage. Therefore, during transfer of the object onto the carriage side, the means or control for making the traveling body (hanger) of the object suspending transportation device travel forward in synch with the carriage becomes unnecessary, so that the entire construction of the transportation facility can be simplified and great cost reduction can be realized.

As a matter of course, the object transported by the carriage to the end point of transportation by the carriage-type transportation device is returned to the traveling body (hanger) side of the object suspending transportation device pulled by the carriage according to an operation of the object return means at the end point of transportation, and thereafter, the object can be transported while being suspended from the traveling body (hanger) of the object suspending transportation device, and also at this time, the traveling body (hanger) of the object suspending transportation device which receives the object from the carriage side has been integrated with the carriage by the hanger engagement means, so that to safely and reliably transfer the object between these, it is not necessary to align the traveling body (hanger) of the object receiving side traveling separately from the carriage with the carriage side, and an operation of safely and reliably returning the object from the carriage-type transportation device to the object suspending transportation device at the end point of transportation of the carriage-type transportation device can also be easily performed.

According to the construction described in the second aspect, the transportation facility of the present invention can be easily carried out by utilizing, for the object suspending transportation device, a trolley conveyor which propels a traveling body by a pusher that moves along a traveling route of the traveling body. According to the construction described in the third aspect, the construction of carriages necessary in large quantity is simplified than in the case where the object receiving means and the object return means are realized by a construction in which the object support devices are lifted and lowered with respect to the carriage, and not only can the transportation facility of the present invention be carried out easily and inexpensively, but also carriage elevating means (elevating guide rails) necessary at the start point and the end point of transportation of the carriage-type transportation device, necessary when the lower side of the transportation route of the carriage of the carriage-type transportation device is formed as an empty carriage return route, can be made to commonly serve as the object receive means and the object return means.

When a hanger that became empty after an object is transferred onto a carriage of the carriage-type transportation device is integrated with the carriage by a hanger engagement means at an unchanged position, if a portion of work such as a work of assembling parts to the object overlaps the hanger and the hanger obstructs the work, the construction described in the fourth aspect is employed, whereby the work portion of the object is separated in the front and rear direction from the empty hanger and the work for the work portion of the object can be easily performed without being obstructed by the empty hanger. In this case, according to the construction described in the fifth aspect, the construction described in the fourth aspect can be easily carried out.

When the carriage-type transportation device propels a carriage that cannot travel by itself by a carriage drive means provided on the carriage traveling route side, by employing the construction described in the sixth aspect or the seventh aspect, the present invention including the construction described in the fifth aspect can be easily carried out.

When the hanger of the object suspending transportation device is a general hanger as a vehicle supporting hanger to be used in an automobile assembly line, that is, a hanger having a pair of left and right hanger arms that open and close in the left and right direction, by employing the construction described in the eighth aspect, the carriage can be made to pull the traveling body of the object suspending transportation device via the hanger more naturally and reliably than in the case where only one hanger arm of the pair of left and right hanger arms is integrated with the carriage side by a hanger engagement means. In addition, the pair of left and right engagement devices which engage the pair of left and right hanger arms, separately, can be switched between engaging positions and disengaging positions by one engagement device position switching means, so that the control becomes easier than in the case where the engagement device position switching means is provided for each engagement device.

When employing the construction described in the eighth aspect, by carrying it out as described in the ninth aspect, it is not necessary to hold the pair of left and right engagement devices at the engaging positions by the position switching means in the entire range of the transportation route by the carriage of the carriage-type transportation device, and as means for switching the pair of left and right engagement devices between the engaging positions and the disengaging positions, cam rails and cam rail drive means for elevating and lowering the cam rails are arranged only at the positions of the object receiving means and the object return means, so that the present invention can be carried out more easily and more inexpensively than in the case where a drive source for switching the positions of the pair of left and right engagement devices must be provided on the carriage side. Furthermore, in this case, according to the construction described in the tenth aspect, while the pair of left and right engagement devices are arranged on the left and right sides of the carriage corresponding to the pair of left and right hanger arms of the hanger, the pair of left and right cam follower rollers that elevate and lower by interlocking with the engagement devices can be arranged so as to be closer to the center side in the left and right width direction of the carriage, so that it becomes easy that the pair of left and right cam rails arranged corresponding to the respective cam follower rollers at positions of the object receiving means and the object return means are integrated and integrally driven to elevate and lower by one cam rail drive means.

According to the construction described in the eleventh aspect, in a situation that the traveling body of the object suspending transportation device is pulled by a carriage via a hanger engaged with and integrated with the carriage by the hanger engagement means, if the traveling body of the object suspending transportation device becomes unable to smoothly travel for some reason and the hanger side becomes a great resistance with respect to the carriage, this situation can be quickly detected by a sensor, so that a necessary measure such as emergency stop of the propelling drive of the carriage can be automatically and easily taken based on a detection signal of the sensor.

BRIEF DESCRIPTION OF THE DRAWINGS

For a complete understanding of the above and other features of the invention, reference shall be made to the following detailed description of the preferred embodiment of the invention and to the accompanying drawings, wherein:

FIG. 9A is a front view showing a hanger engagement means in an engaging state, and FIG. 9B is a front view showing the hanger engagement means in a disengaging state;

Figure 1:
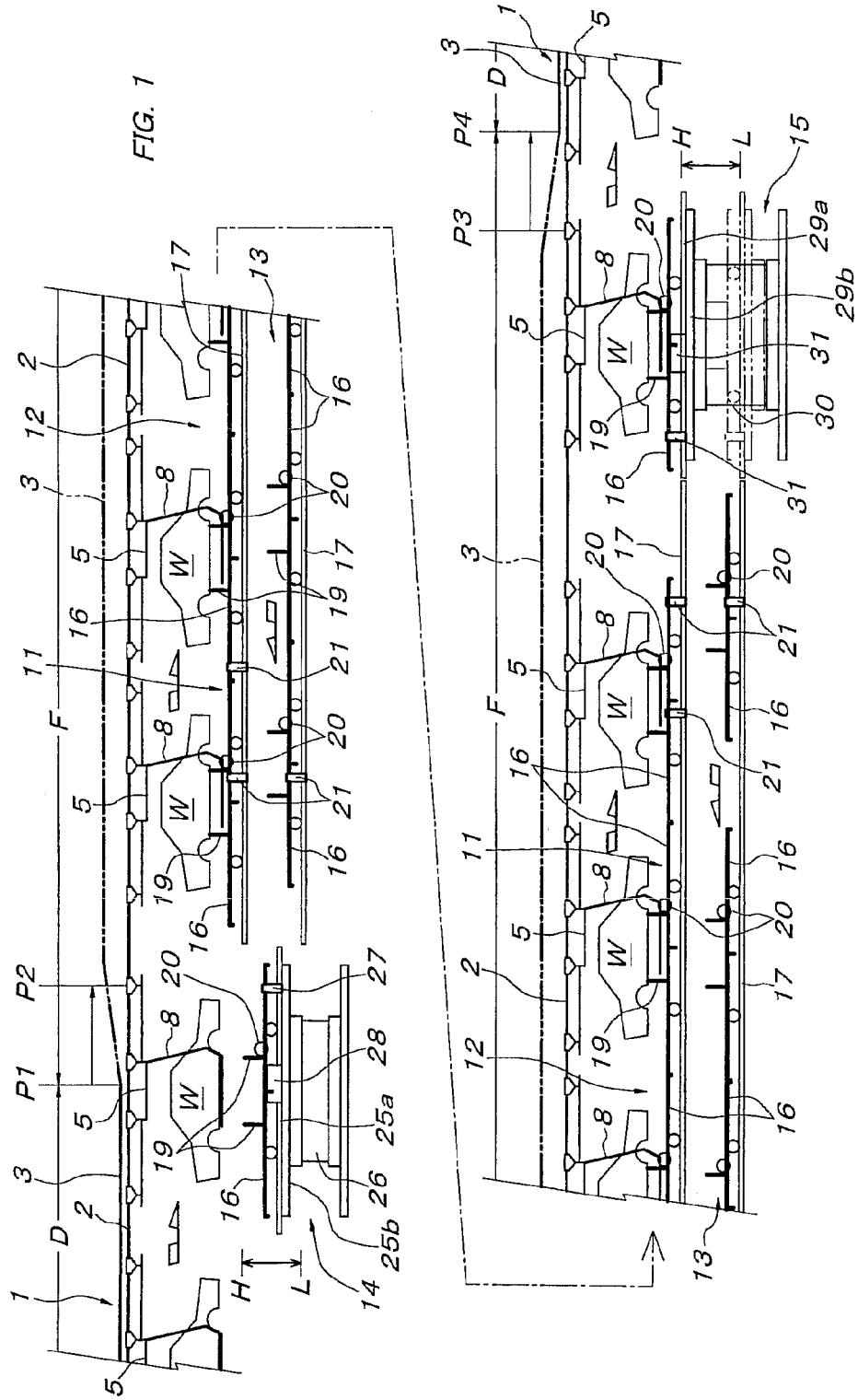
FIG. 1 is a schematic side view for describing an entire construction of a transportation facility of the present invention.

DESCRIPTION OF THE REFERENCE NUMERALS 1 power & free trolley conveyor (object suspending transportation device)
2 free line
3 power line
4, 4a trolley
5 traveling body
6 driven dog
8 object support hanger
9c object support of hanger arm
10a, 10b a pair of left and right hanger arms
11 carriage-type transportation device
12 transportation route
13 carriage return route
14 object receiving means
15 object return means
16 carriage
19 object support device
20 hanger engagement means
21 friction drive means
22a, 22b a pair of left and right zonal vertical friction surfaces
23 motor-driven friction drive wheel
24 backup roller
25a, 29a elevating guide rail
25a, 29b elevating base
26, 30 elevating drive means
27, 31 carriage lead-in and sending-out means
28, 32 carriage feeder
34a, 34b a pair of left and right engagement devices
35a, 35b engagement device position switching means
37a, 37b seesaw moving body
38a, 38b a pair of left and right rod-like elevating bodies
39a, 39b cam follower roller
40a, 40b tension spring
42a, 42b engaged portion of hanger
43a, 43b a pair of front and rear engaging portions (rollers)
44a L-shaped arm
44b bearing member
46 lever arm
47 spring
51 overload detecting sensor
52a, 52b a pair of left and right cam rails
54 cam rail drive means (cylinder unit)
55 gripped portion on carriage side
56a, 56b a pair of front and rear opening and closing gripping pieces
57 opening and closing drive means
58 moving drive means
60 movable member
61 slide guide
62 relay rod
63, 66 cylinder unit
65 link
D drive section of trolley conveyor
F drive releasing section of trolley conveyor
W object

DETAILED DESCRIPTION OF THE INVENTION

Figure 2:
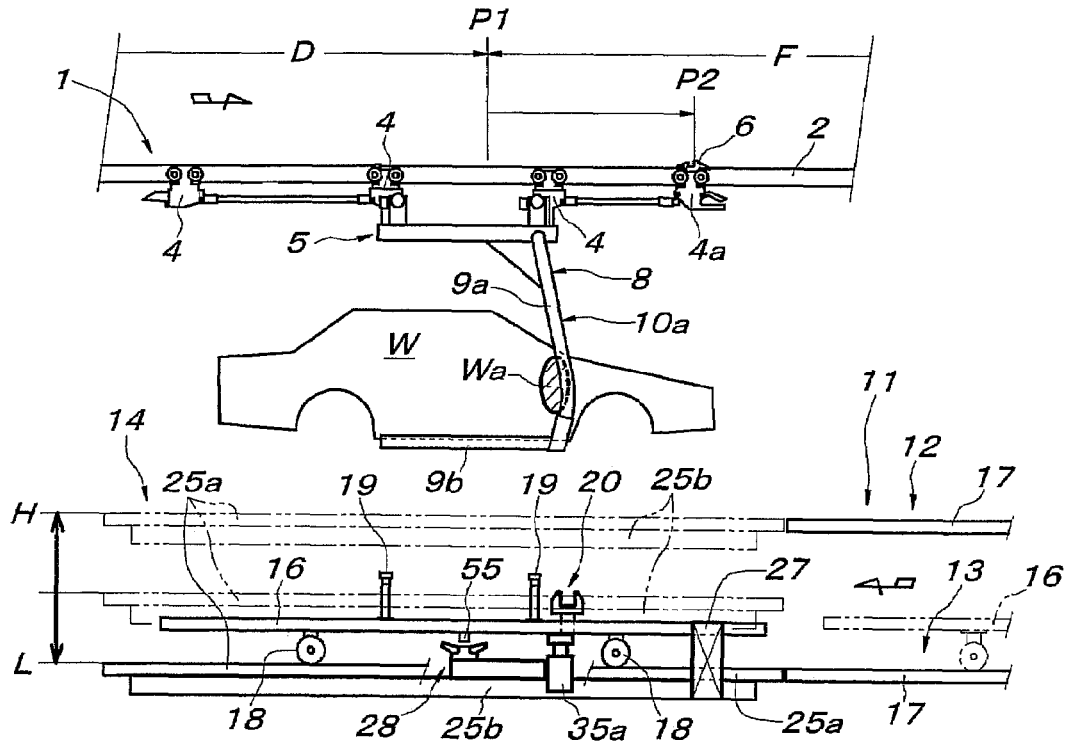
FIG. 2 is a side view for describing a state immediately before receiving an object transported while being suspended by an object receiving means.

Hereinafter, a detailed embodiment of the present invention will be described with reference to the accompanying drawings. In FIG. 1 and FIG. 2, the reference numeral 1 denotes a conventionally known power & free trolley conveyor used in this embodiment as an object suspending transportation device, and includes a free line 2 formed of a lower guide rail and a power line 3 formed of an upper guide rail, and from the free line 2, a traveling body 5 is suspended via a plurality of trolleys 4 and 4a, and from the upper guide rail of the power line 3, a drive chain having pushers at appropriate intervals engageable with a driven dog 5 provided on the forefront trolley 4a of the traveling body 5 is suspended via trolleys, and in a drive section D in which the vertical distance between the free line 2 and the power line 3 is set so as to enable the pusher on the power line 3 side to engage with the driven dog 6 of the traveling body 5 on the free line 2 side, the traveling body 5 is propelled along the free line 2 by the pusher, and in a drive releasing section F in which the vertical distance between the free line 2 and the power line 3 becomes wider than the above-described distance or the power line 3 comes apart sideward from the position above the free line 2, the drive of the traveling body 5 by the pusher is released, the traveling body 5 stops on the free line 2, and if a positioning means on the free line 2 is not provided, the traveling body can freely move on the free line 2.

The power line 3 in the drive releasing section F shown by an imaginary line in FIG. 1 is spaced upward from the free line 2, and is returned to the original height in the driving section D on the downstream side of the drive releasing section F, however, the power line 3 may make a detour sideward in this drive releasing section F, and as the power line 3 to be used in the drive section D on the downstream side of the drive release section F, or a power line 3 of another system driven by a drive means different from that of the power line 3 used in the drive section D on the upstream side of the drive releasing section F may be used.

Figure 8:
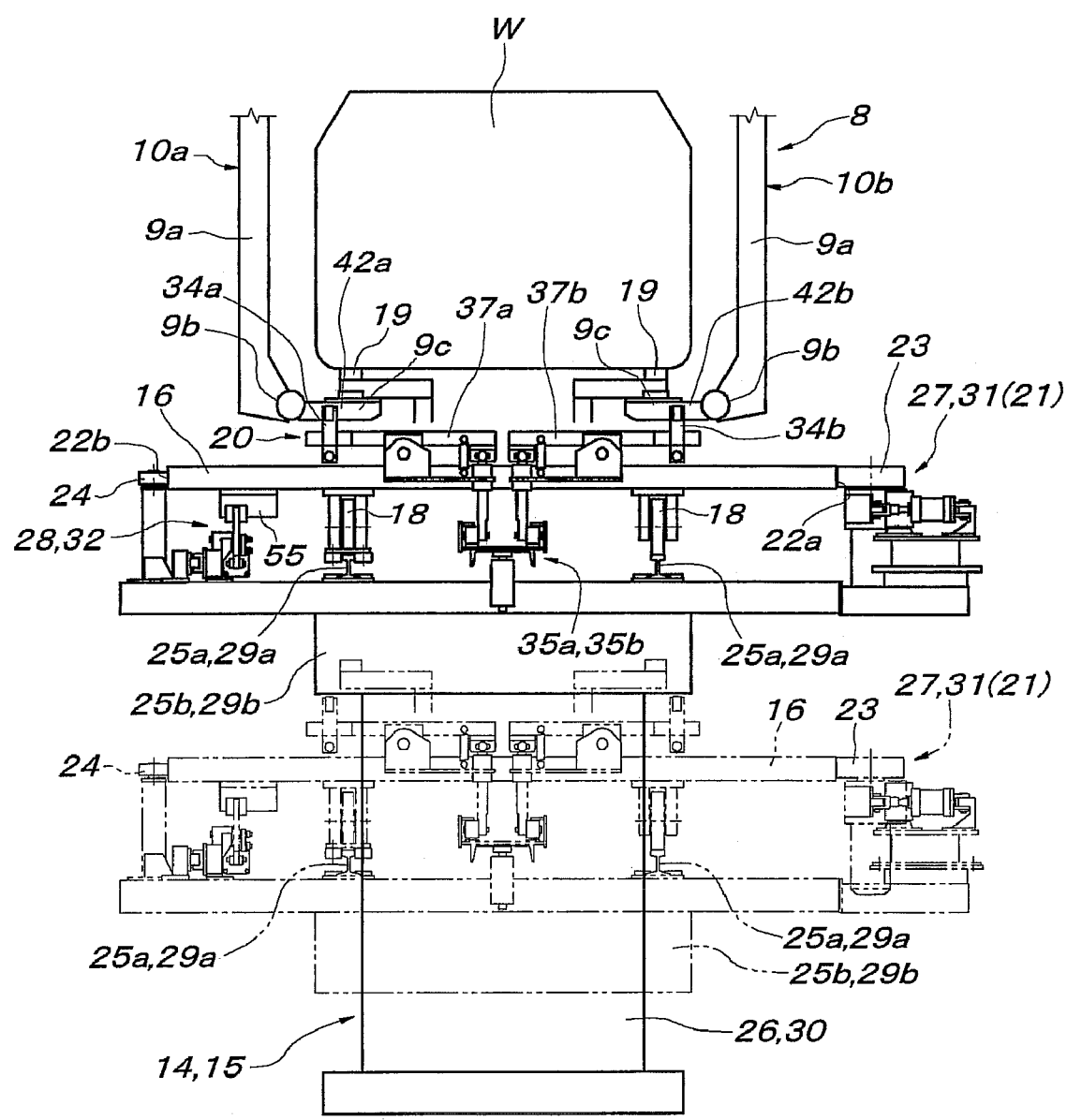
FIG. 8 is a front view for describing a construction of the object receiving means and the object return means.

From the traveling body 5 of the trolley conveyor 1, an object support hanger 8 is suspended. This hanger 8 consists of, as shown in FIG. 2 and FIG. 8, a pair of left and right hanger arms 10a and 10b, and each hanger arm 10a, 10b is composed of a vertical rod 9a, a horizontal rod 9b extending substantially horizontally rearward from the lower end of the vertical rod 9a, and an object support 9c continuously provided inwardly from the horizontal rod 9b. An object W such as a vehicle body is supported at its left and right sides at the bottom portion by the object supports 9c of both hanger arms 10a and 10b in a state in which the vehicle body is settled inside the vertical rods 9a of both hanger arms 10a and 10b when viewed from the front side. Both hanger arms 10a and 10b are formed so as to be movable to open and close in the left and right direction for loading and unloading the object W.

In FIG. 1, the reference numeral 11 denotes a carriage-type transportation device including a transportation route 12 provided in parallel to the free line 2 immediately under the free line 2 in the drive releasing section F of the trolley conveyor 1, a carriage return route 13 provided in parallel to the transportation route 12 below the transportation route 12, an object receiving means 14 provided at a start point of transportation of the transportation route 12, and an object return means 15 provided at an end point of transportation of the transportation route 12, and a plurality of carriages 16 cyclically travel so as to return to the object receiving means 14 via the transportation route 12, the object return means 15, and the carriage return route 13 in this order from the object receiving means 14. Therefore, each carriage has an entire length that is an appropriate length longer than one object W, and is supported on the guide rails 17 on the sides of the transportation route 12 and the carriage return route 13 via wheels 18 so as to rectilinearly travel, and is provided with object support devices 19 and a hanger engagement means 20, however, the carriage is not provided with a traveling drive means, and it travels by means of a propulsive force received from a friction drive means 21 (see FIG. 1) provided by the side of the traveling route. As shown in FIG. 8, similar to the carriage lead-in and sending-out means 27 and 31 arranged on the object receiving means 14 and the object return means 15, the friction drive means 21 is formed by a combination of a motor-driven friction drive wheel 23 that comes into pressure contact with one friction surface 22a of a pair of left and right zonal vertical friction surfaces 22a and 22b (in the illustration, the left and right side surfaces of the carriage 16 are used as they are) provided on the carriage 16 continuously across the entire length of the carriage 16 in parallel to the traveling direction of the carriage 16, and a backup roller 24 that comes into contact with the other friction surface 22b.

The friction drive means 21 is provided together with a braking means, etc., as appropriate at appropriate positions of the transportation route 12 and the carriage return route 13 of the carriage-type transportation device 11 as shown in FIG. 1, and on the transportation path 12, takes the carriage 16 sent into the transportation route 12 from the object receiving means 14 and propels it at a constant speed to the end point of the transportation route 12 in a front-rear facing state in which the front carriage 16 is pushed from the rear side by the after carriage 16 immediately behind said carriage 16, and sends-out the carriages 16 one by one to the object return means 15 from the end point of the transportation route 12 when the object return means 15 becomes able to accept the carriage, and on the carriage return route 13, takes the carriage 16 sent-out from the object return means 15 into the carriage return route 13 and makes it travel at a high speed to the object receiving means 14 side, and sends-out the carriages 16 one by one to the object receiving means 14 from the end point of the carriage return route 13 when the object receiving means 14 becomes able to accept the carriage.

The object receiving means 14 is composed of, as shown in FIG. 2, an elevating base 25b on which elevating guide rails 25a with a length capable of supporting one carriage 16 are laid, and an elevating drive means 26 which elevates and lowers this elevating base 25b between an elevation limit level H at which the elevating guide rails 25a are connected to the start points of the guide rails 17 of the transportation route 12 and a lowering limit level L at which the elevating guide rails 25a are connected to the end points of the guide rails 17 of the carriage return route 13, and on the elevating base 25b, a carriage lead-in and sending-out means 27 and a carriage feeder 27 are mounted.

Figure 7:
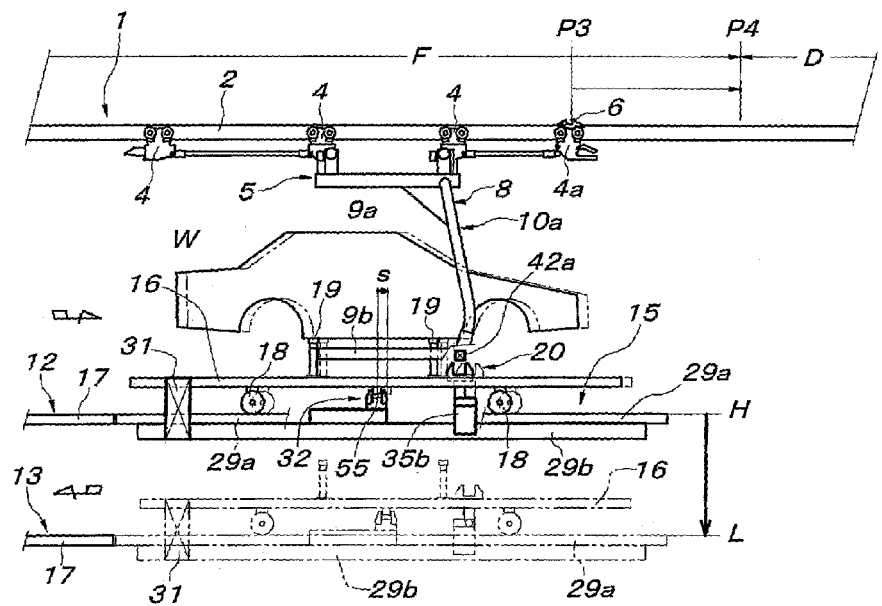
FIG. 7 is a side view for describing action in an object return means.

The object return means 15 is composed of, as shown in FIG. 7, an elevating base 29b on which elevating guide rails 29a with a length capable of supporting one carriage 16, and an elevating drive means 30 which elevates and lowers the elevating base 29b between an elevating limit level H at which the elevating guide rails 29a are connected to end points of the guide rails 17 of the transportation route 12 and a lowering limit level L at which the elevating guide rails 29a are connected to the start points of the guide rails 17 of the carriage return route 13, and on the elevating base 29b, a carriage lead-in and sending-out means 31 and a carriage feeder 32 are mounted. For the elevating drive means 26 and 30, conventionally known methods such as a cross-link mechanism method, a rack pinion gear method, and a direct elevation driving method using a cylinder, etc., are used.

Figure 9:
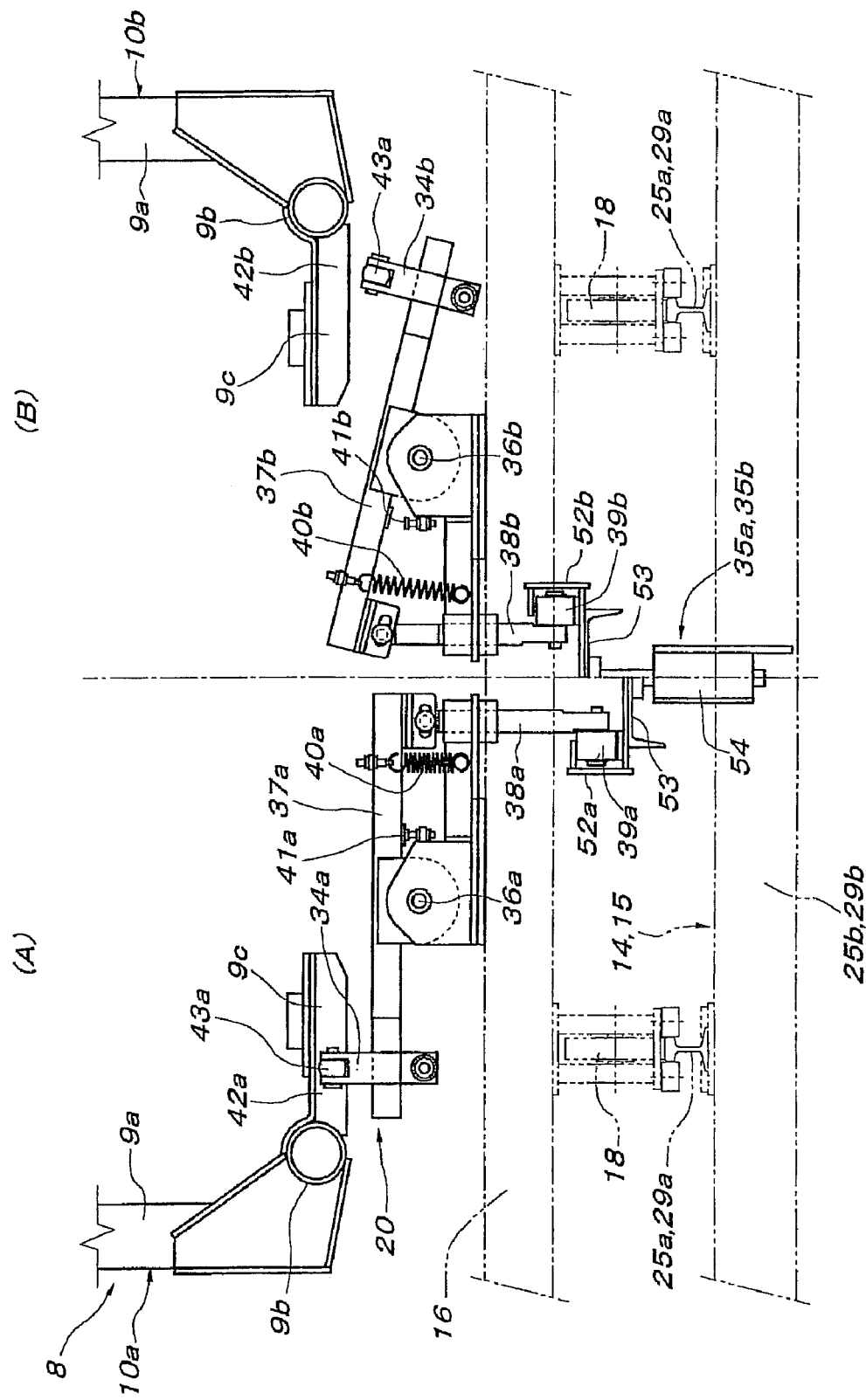
FIG. 9 are views for describing a construction of a hanger engagement means.

The hanger engagement means 20 provided on each carriage 16 is composed of, as shown in FIG. 8 and FIG. 9, a pair of left and right engagement devices 34a and 34a, engagement device position switching means 35a and 35b which switch the engagement devices 34a and 34b between upper engaging positions and lower disengaging positions. The pair of left and right engagement devices 34a and 34b are provided at the outer ends of a pair of left and right seesaw moving bodies 37a and 37b which are arranged symmetrically and whose central portions are axially supported on the carriage 16 side by front-to-rear horizontal shafts 36a and 36b, and to the inner ends of the seesaw moving bodies 37a and 37b, upper ends of the pair of left and right rod-like elevating bodies 38a and 38b supported on the carriage 16 side so as to only elevate and lower are joined via slots and pins, respectively, and on the lower end outer sides of these rod-like elevating bodies 38a and 38b, cam follower rollers 39a and 39b are axially supported by left-to-right horizontal shafts, and the seesaw moving bodies 37a and 37b are urged by tension springs 40a and 40b laid across the inner end sides of the seesaw moving bodies 37a and 37b and the carriage 16 sides so that the inner end sides of the seesaw moving bodies 37a and 37b are received and stopped by stopper 41a and 41b on the carriage 16 side. Therefore, when a downward operating force is not applied to the cam follower rollers 39a and 39b, the engagement devices 34a and 34b are held at the upper engaging positions, both rod-like elevating bodies 38a and 38b elevate to the elevation limits, and the cam follower rollers 39a and 39b are concentrically positioned at the elevation limits.

Figure 10:
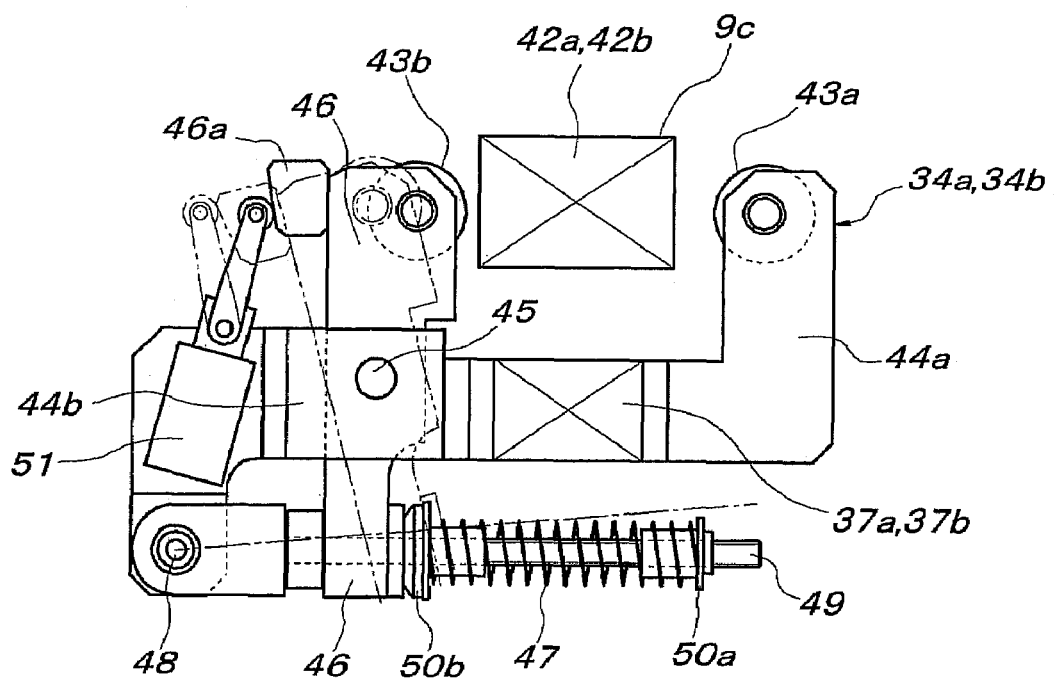
FIG. 10 is a side view for describing a detailed construction of an engagement device of the hanger engagement means.

The pair of left and right engagement devices 34a and 34b are formed of, as shown in FIG. 10, a pair of front and rear engaging portions 43a and 43b which sandwich engaged portions 42a and 42b formed by the base portions of the object supports 9c on the pair of left and right hanger arms 10a and 10b of the object support hanger 8 from the front side and the rear side. These engaging portions 43a and 43b are composed of rollers axially supported by support shafts that become horizontal in the left and right direction when the engagement devices 34a and 34b are at the upper engaging positions (when the seesaw moving bodies 37a and 37b are in a horizontal posture), and the roller of the front engaging portion 43a positioned on the carriage traveling direction side in the transportation route 12 is axially supported on a tip end of the L-shaped arm 44a continuously provided from the outer end of the seesaw moving bodies 37a and 37b, and the roller of the rear engaging portion 43b which pushes the hanger 8 from the rear side is axially supported on an upper end of the lever arm 46 whose intermediate position is axially supported by a support shaft 45 parallel to the support shaft axially supporting the roller on a bearing member 44b provided continuously from the outer ends of the seesaw moving body 37a, 37b, and is formed movable within a predetermined range in a direction of moving apart from and coming closer to (in the front and rear direction) the roller of the front engaging portion 43a, and by a spring 47 that presses and urges the lower end of the lever arm 46, urged and held at a position where a recess is formed in which the engaging portion 42a, 42b is relatively fitted is formed between the same and the roller of the front end engaging portion 43a. The spring 47 is freely fitted to a shaft rod 49 between a spring bearing 50a screwed and fitted to a free end of the shaft rod 49 which is axially supported by a support shaft 48 on the tip end of a bearing member 44b and penetrates the lower end of the lever arm 46, and a movable spring bearing 50 freely fitted to the shaft rod 49 so as to be freely movable in the axial direction, and urges the lower end of the lever arm 46 via the movable spring bearing 50.

To the pair of left and right engagement devices 34a and 34b, overload detecting sensors 51 are attached, respectively. This sensor 51 is constituted by a limit switch attached to the bearing member 44b, and detects that the lever arm 46 (rear engaging portion 43b) swings by a predetermined angle against an urging force of the spring 47 via a contact member 46a provided on the upper end outer side of the lever arm 46 in each of engagement devices 34a and 34b.

The engagement device position switching means 35a is provided on the elevating base 25b of the object receiving means 14 as shown in FIG. 2, and the engagement device position switching means 35b is provided on the elevating base 29b of the object return means 15 as shown in FIG. 7, and each of the engagement position switching means 35a and 35b is composed of a pair of left and right cam rails 52a and 52b which both cam follower rollers 39a and 39b of the carriage 16 fit to, respectively, as shown in FIG. 8 and FIG. 9 when this carriage 16 is transferred onto a predetermined position on the elevation guide rails 25 of the object receiving means 14 or the elevation guide rails 30 of the object return means 15, and a cam rail drive means (cylinder unit 54) which drives to elevate and lower one elevating base 53 supporting both cam rails 52a and 52b.

Figure 12:
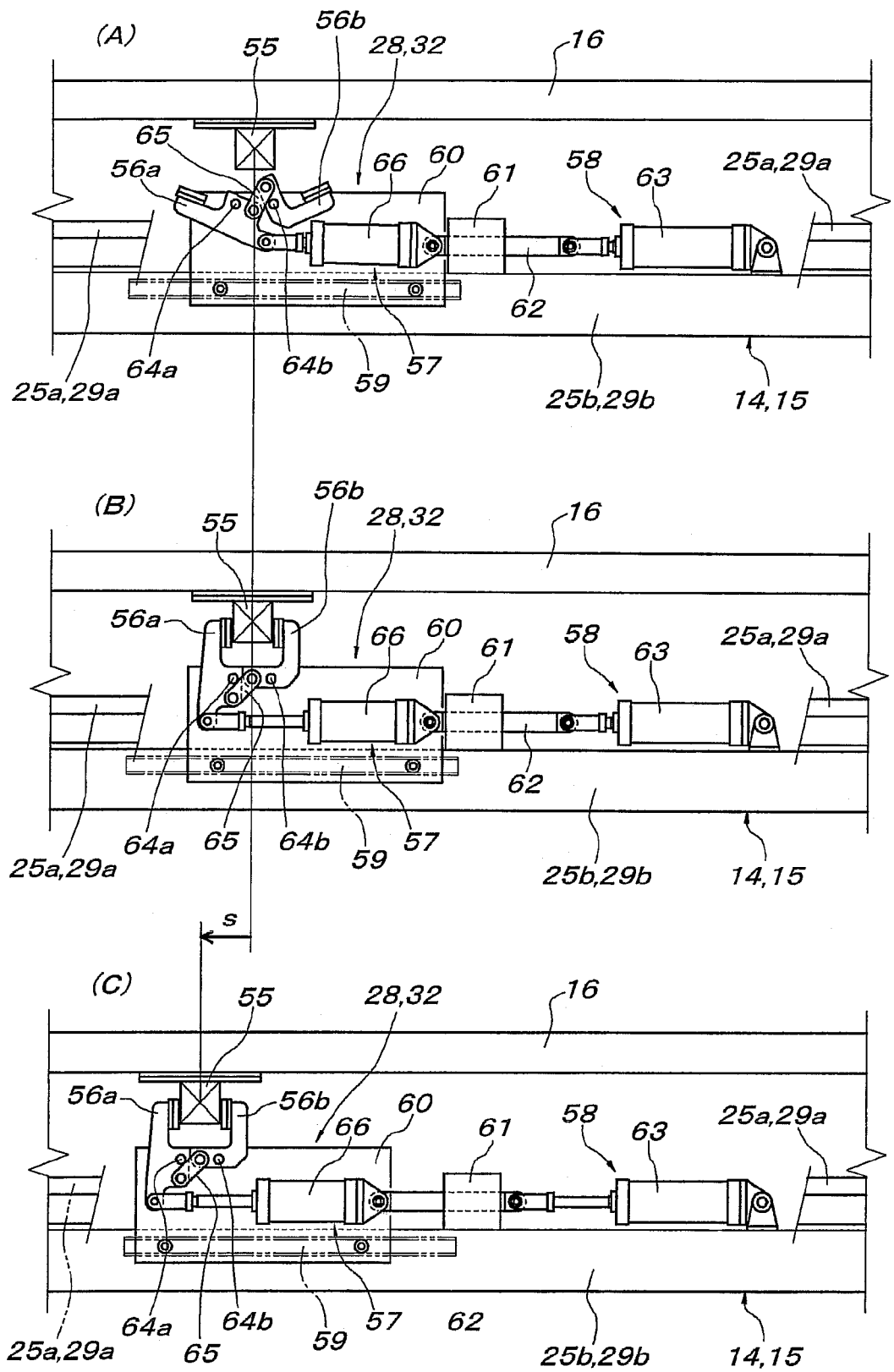
FIG. 12A through FIG. 12C are side views for describing states of a carriage feeder at the respective steps.

The carriage feeder 28 provided on the elevating base 25b of the object receiving means 14 and the carriage feeder 32 provided on the elevating base 29b of the object return means 15 are composed of, as shown in FIG. 8 and FIG. 12, a pair of front and rear opening and closing gripping pieces 56a and 56b which grip a gripped portion 55 projectedly provided downward on the left or right one side of the bottom of the carriage 16 from the front side and the rear side, an opening and closing drive means 57 for the opening and closing gripping pieces 56a and 56b, and a moving drive means 58 which reciprocates the opening and closing gripping pieces 56a and 56b in the front and rear direction. In detail, the pair of front and rear opening and closing gripping pieces 56a and 56b and the opening and closing drive means 57 are attached to a movable member 60 supported movably in the front and rear moving direction of the carriage 16 on the elevating guide rail 25a, 29a via the slide guide rail 59 provided on the elevating base 25b, 29b, and the moving drive means 58 is composed of a cylinder unit 63 interposed between the other end of a relay rod 62 that has one end joined to the movable member 60 and is supported movably in the front and rear direction by a slide guide 61 attached to the elevating base 25b, 29b, and the elevating base 25b, 29b.

The pair of opening and closing gripping pieces 56a and 56b are axially supported on the movable member 60 by support shafts 64a and 64b, respectively, and are interlocked and joined by a link 65 so as to open and close in conjunction with each other, and between one opening and closing gripping piece 56a and the movable member 60, a cylinder unit 66 forming the opening and closing drive means 57 is interposed.

Therefore, the pair of front and rear opening and closing gripping pieces 56a and 56b can be operated to open and close according to the projecting and withdrawing of the piston rod of the cylinder unit 66, and the pair of front and rear opening and closing gripping pieces 56a and 56b can be moved forward and rearward together with the opening and closing drive means 57 (cylinder unit 66) according to the projecting and withdrawing of the piston rod of the cylinder unit 63.

Hereinafter, a method of using the transportation facility constructed as described above is described. Driving of the traveling body 5 that travels in the drive section D toward the drive releasing section F of the trolley conveyor L, that is, the traveling body 5 suspending the object W by the hanger 8 is released at the end point position (start point position of the drive releasing section F) P1 of the drive section D shown in FIG. 1 and FIG. 2, so that it is moved by an appropriate auxiliary feeder (not shown) provided in the free line 2 to the fixed stop position P2 at which the hanger 8 is positioned at a predetermined position above the object receiving means 14. As a matter of course, it is also possible that the end point position P1 of the drive section D is set to the fixed stop position P2 with respect to the object receiving means 14 and the auxiliary feeder is omitted as long as the traveling body 5 can be accurately stopped at the end point position P1 of the drive section D of the trolley conveyor 1.

On the other hand, in the object receiving means 14, the elevating base 25b is lowered to the lowering limit level L, and from a position on the guide rails 17 of the carriage return route 13 in the carriage-type transportation device 11 to a predetermined position on the elevating guide rails 25a on the object receiving means 14, one empty carriage 16 is transferred by the friction drive means 21 provided at the end point of the carriage return route 13 and the carriage lead-in means 27 on the elevating base 25b side. The hanger engagement means 20 of the empty carriage 16 on the carriage return route 13 is in a state in which the pair of left and right engagement devices 34a and 34b thereof are held at the upper engaging positions due to the urging forces of the springs 40a and 40b shown in FIG. 9, so that on the object receiving means 14 side for leading-in this empty carriage 16, the cam rails 52a and 52b of the engagement device position switching means 35a provided on the elevating base 25b are lowered to the lowering limit level by the cam rail drive means (cylinder unit) 54, and the pair of left and right cam follower rollers 39a and 39b of the hanger engagement means 20 of the empty carriage 16 to be led onto the elevating guide rails 25a are made to enter into the cam rails 52a and 52b of the engagement device position switching means 35a (see FIG. 9A). Then, when the empty carriage 16 is led-in to and stopped at the predetermined position, the cam rails 52a and 52b of the engagement device position switching means 35a are elevated to the elevation limit level by the cam rails drive means (cylinder unit) 54, and the seesaw moving bodies 37a and 37b are made to swing against the urging forces of the springs 40a and 40b via the cam follower rollers 39a and 39b, whereby the pair of left and right engagement devices 34a and 34b are switched to the lower disengaging positions (see FIG. 9B). As shown in FIG. 1, the elevating base 25b of the object receiving means 14 onto which the empty carriage 16 is transferred at a predetermined position can be made to wait in a state in which it is elevated to a middle level between the lowering limit level L and the elevation limit level H.

Figure 3:
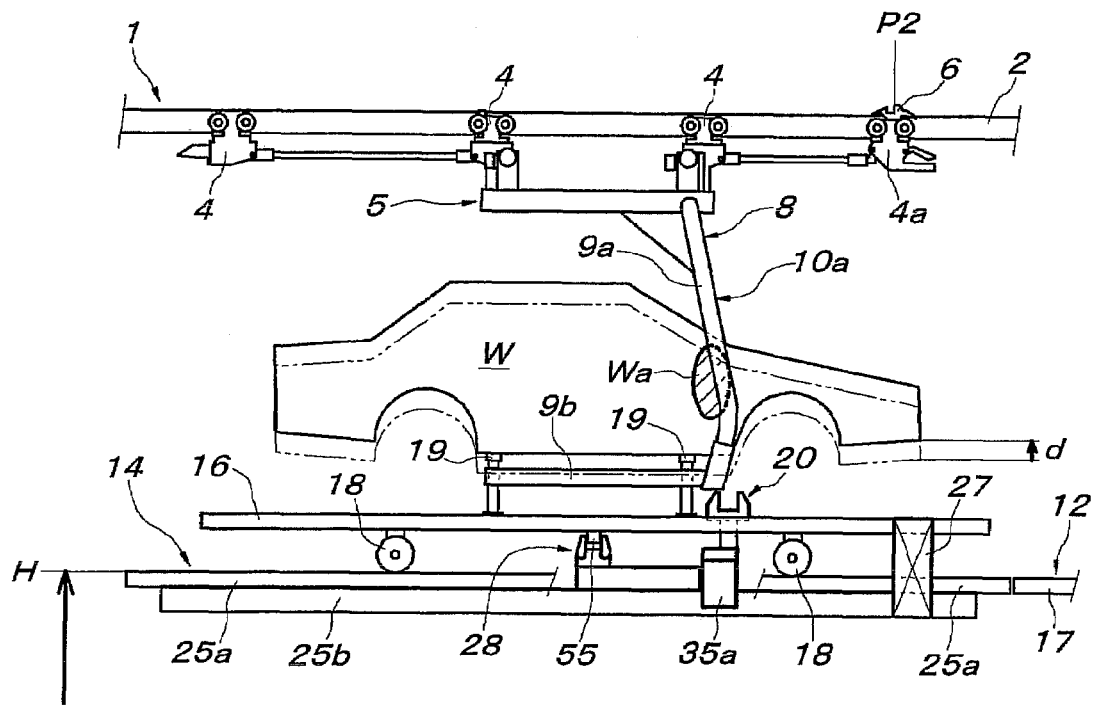
FIG. 3 is a side view for describing a state one-step advanced from the state of FIG. 2.
Figure 11:
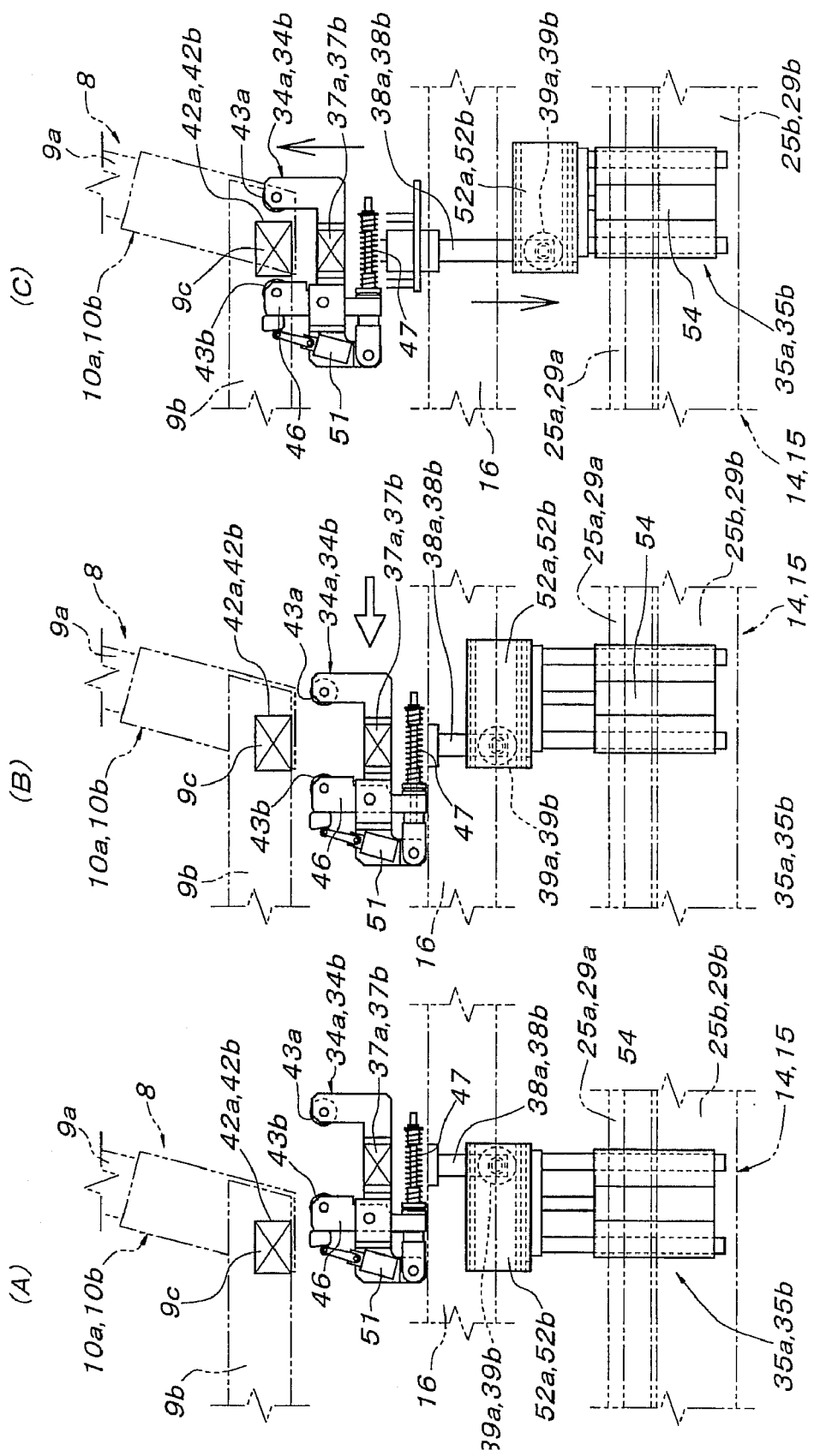
FIG. 11A through FIG. 11C are side views for describing states of the hanger engagement means at the respective steps.

As described above, when the traveling body 5 of the trolley conveyor 1 stops at the fixed stop position P2 with respect to the object receiving means 14, as shown in FIG. 3, the elevating base 25b of the object receiving means 14 supporting the empty carriage 16 at the predetermined position is elevated to the elevation limit level H. As a result, the object W supported by the hanger 8 of the traveling body 5 is lifted by the object support devices 19 of the empty carriage 16, and the object W is floated by a predetermined height d from the hanger 8. At this time, the pair of left and right engagement devices 34a and 34b of the hanger engagement means 20 switched to the lower disengaging positions are at a predetermined distance forward and downward more than the engaged portions 42a and 42b of the hanger 8 that had supported the object W as shown in FIG. 11A. The carriage feeder 28 provided on the elevating base 25b of the object receiving means 14 is in a state in which the pair of front and rear opening and closing gripping pieces 56a and 56b are opened in the front and rear direction at a position immediately below the gripped portion 55 of the carriage 15 stopping at the predetermined position on the elevating guide rails 25a (the piston rod of the cylinder unit 66 is led-in) as shown in FIG. 12A.

Figure 4:
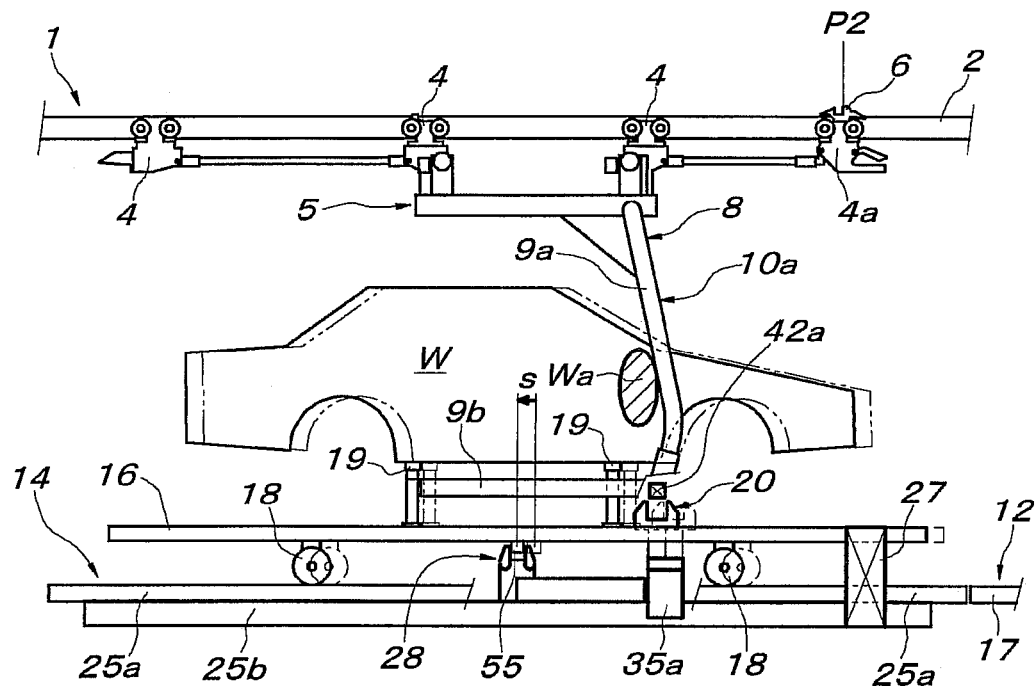
FIG. 4 is a side view for describing a state one-step advanced from the state of FIG. 3.
Figure 5:
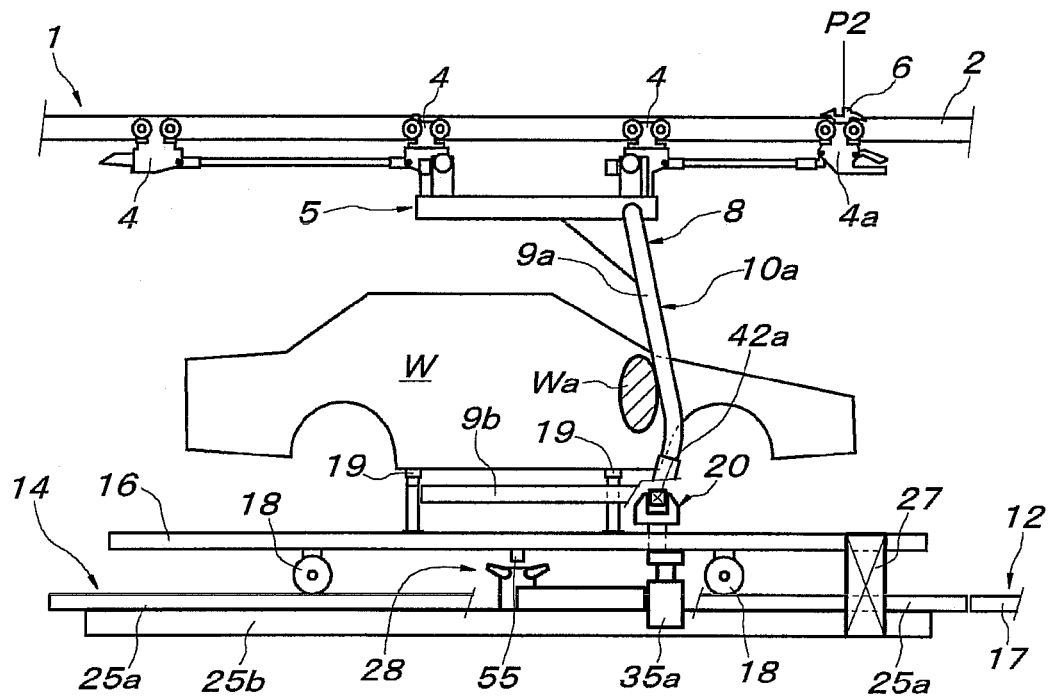
FIG. 5 is a side view for describing a state one-step advanced from the state of FIG. 4.

When the carriage 16 on the elevating guide rails 25a are made to accept the object W from the hanger 8 of the traveling body 5, as shown in FIG. 12B, the piston rod of the cylinder unit 66 in the carriage feeder 28 is made to project to close the pair of front and rear opening and closing gripping pieces 56a and 56b, whereby the gripped portion 55 of the carriage 16 supporting the object W is gripped by the pair of front and rear opening and closing gripping pieces 56a and 56b from the front side and rear side. In this state, by moving the movable member 60 rearward by a predetermined distance s by the cylinder unit 63 of the moving drive means 58, as shown in FIG. 4, this carriage 16 is moved rearward by the predetermined distance s on the elevating guide rails 25a. At this time, the hanger engagement means 20 is provided on the carriage 16, so that as shown in FIG. 4 and FIG. 11B, the pair of left and right engagement devices 34a and 34b of the hanger engagement means 20 switched to the lower disengaging positions also move rearward by the predetermined distance s with respect to the hanger 8, and the pair of left and right engagement devices 34a and 34b are positioned immediately below the engaged portions 42a and 42b of the hanger 8. Thereby, the cam follower rollers 39a and 39b that move rearward integrally with the engagement devices 34a and 34b move within the cam rails 52a and 52b that are on the elevating base 25b side and do not move rearward, and the lengths of the cam rails 52a and 52b are set so as to prevent the cam follower rollers 39a and 39b from coming out from the cam rails 52a and 52b due to said movement. Therefore, in this state, by lowering the cam rails 52a and 52b of the engagement position switching means 35a to the lowering limit level by the cam rail drive means (cylinder unit) 54 and swinging and returning the seesaw moving bodies 37a and 37b on the carriage 16 side to the horizontal postures in the urging directions of the springs 40a and 40b via the cam follower rollers 39a and 39b (see FIG. 9A), the pair of left and right engagement devices 34a and 34b are switched from the lower disengaging positions to the upper engaging positions, and as shown in FIG. 5 and FIG. 11C, the engagement devices 34a and 34b are engaged with the engaged portions 42a and 42b of the hanger 8. That is, between the pair of front and rear engaging portions (rollers) 43a and 43b of the respective engagement devices 34a and 34b, the engaged portions 42a and 42b of the hanger 8 are fitted.

By the above-described series of operations in the object receiving means 14, the object W that was transported while being suspended from and supported by the hanger 8 of the trolley conveyor 1 as shown in FIG. 2 is supported by the object support devices 19 of the carriage 16 in a state in which it is lifted with respect to the hanger 8 and moved rearward by the predetermined distance s, and the hanger 8 which is released from support of the object W is engaged with the carriage 16 via the hanger engagement means 20. Therefore, even if the work areas Wa on both left and right sides of the object W (for example, portions where the front left and right doors are attached to the vehicle body) are at positions overlapping the vertical rods 9a of the pair of left and right hanger arms 10a and 10b of the hanger 8 viewed sideways when the object W is transported while being suspended from and supported by the hanger 8 of the trolley conveyor 1, at the final stage at which this object is transferred from the hanger 8 onto the carriage 16, the work areas Wa are moved to the positions deviating rearward from the vertical rods 9a of the pair of left and right hanger arms 10a and 10b of the hanger 8 positioned on both left and right sides of the object W, viewed sideways. In other words, in order to obtain this result, the rearward moving distance s of the carriage 16 by the carriage feeder 28 on the object receiving means 14 is set.

Figure 6:
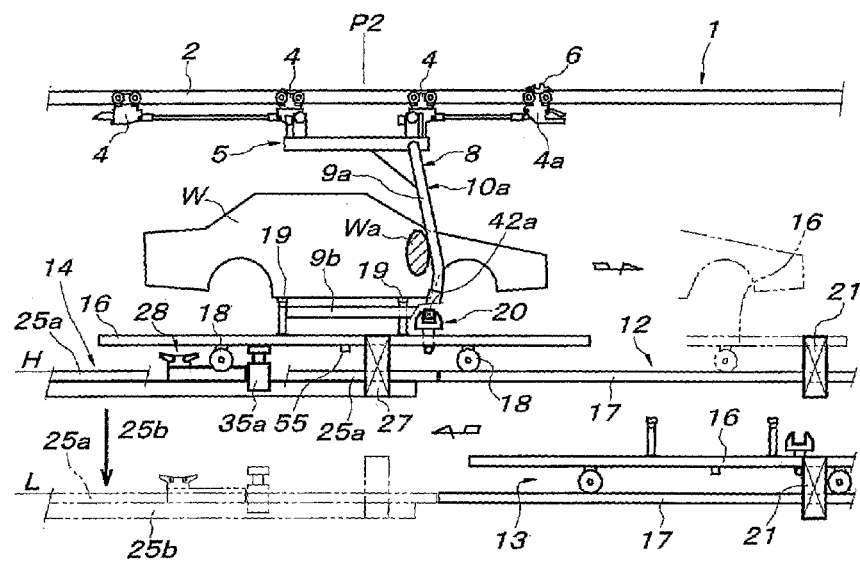
FIG. 6 is a side view for describing a state when a carriage is sent out to a transportation route of a carriage-type transportation device from the object receiving means.

Next, the piston rod of the cylinder unit 66 in the carriage feeder 28 is withdrawn to open the pair of front and rear opening and closing gripping pieces 56a and 56b, and after these opening and closing gripping pieces 56a and 56b are made to escape to a lower level than the gripped portion 55 on the carriage 16 side, immediately or at a subsequent appropriate time, the movable member 60 is returned forward by the predetermined distance s by the cylinder unit 63 of the moving drive means 58, and this carriage feeder 28 is restored to the original standby state. When the opening and closing gripping pieces 56a and 56b are opened so as to escape to a lower level than the gripped portion 55 on the carriage 16 side as described above, as shown in FIG. 6, the carriage 16 on the elevating guide rails 25a in this object receiving means 14 is sent-out onto the guide rails 17 of the transportation route 12 by the carriage lead-in and sending-out means 27 and driven to travel at a constant speed on this transportation route 12 by the friction drive means 12 of the transportation route 12, whereby the work W supported by the object support devices 19 is transported at a constant speed on the transportation route 12, and the traveling body 5 of the trolley conveyor 1 having the hanger 8 which is released from support of the object W can be pulled and moved by the carriage 16 along the free line 2 via the hanger 8 and the hanger engagement means 20 in the drive releasing section F parallel to the transportation route 12 on which the carriage 16 travels. In this state, for example, a work for the work areas Wa on both the left and right sides of the object W can be performed by an operator getting on the carriage 16 without being obstructed by the hanger 8 of the traveling body 5 of the trolley conveyor 1 that moves integrally with the object W.

In the transportation process of the object W by the carriage 16 in the carriage-type transportation device 11 described above, when some failure occurs in the traveling body 5 or the hanger 8 on the trolley conveyor 1 side engaged with the carriage 16 by the hanger engagement means 20 and is pulled and disturbs the smooth advancing movement of the traveling body 5 or the hanger 8, overload occurs on the hanger engagement means 20 on the carriage 16 side. This overload acts rearward on the rear engaging portion 43b forming the pair of left and right engagement devices 34a and 34b in the hanger engagement means 20, so that as a result, the rear engaging portions 43b tilt rearward against the urging force of the spring 47, and this tilting is detected by a sensor 51, so that by using a detection signal of this sensor 51, a measure for safety such as emergency stop of the carriage 16 can be automatically taken.

Subsequent objects W suspended and transported by the trolley conveyor 1 are also transferred onto the carriages 16 of the carriage-type transportation device 11 in the object receiving means 14 by the above-described series of operations, and the traveling bodies 5 of the trolley conveyor 1 that suspended and transported the objects W are also engaged with the carriages 16 via hangers 8 and successively sent onto the transportation route 12 of the carriage-type transportation device 11 by the carriages 16 integrally with the suspended and transported objects W, and transported at a constant speed in a state in which the carriages 16 are made to face each other in the front and rear direction, and during this, a predetermined work can be performed for the objects W on the carriages 16.

The carriage 16 that reached the end point of the transportation route 12 of the carriage-type transportation device 11 is transferred onto the elevating guide rails 29a of the object return means 15. That is, as shown in FIG. 7, the elevating base 29b of the object return means 15 is elevated to the elevation limit level H by the elevating drive means 30, and the elevating guide rails 28a are connected to the guide rails 17 of the transportation route 12 of the carriage-type transportation device 11. Then, when the carriage 16 is sent onto the elevating guide rails 29a by the friction drive means 21 at the end point of the transportation route 12 of the carriage-type transportation device 11, this carriage 16 is led into a predetermined position on the elevating guide rails 29a by the carriage lead-in and sending-out means 31 on the elevating base 29b side, and stopped there. At this time, as shown in FIG. 1 and FIG. 7, the traveling body 5 (hanger 8) of the trolley conveyor 1 engaged with the carriage 16 by the hanger engagement means 20 and pulled by the carriage stops at the fixed stop position P3 on the more upstream side by a predetermined distance than the end point position (start point position of the drive section D) P4 of the drive releasing section F of the trolley conveyor 1. The cam follower rollers 39a and 39b of the hanger engagement means 20 engaging with the hanger 8 enter into the cam rails 52a and 52b lowered to the lowering limit positions of the engagement position switching means 35b on the elevating base 29b side, and the pair of front and rear opening and closing gripping pieces 56a and 56b of the carriage feeder 32 on the elevating base 29b side are at the retreating limit positions (positions at which the piston rod of the cylinder unit 63 is withdrawn) and opened, and the gripped portion 55 on the carriage 16 side stops immediately above between the pair of front and rear opening and closing gripping pieces 56a and 56b in this opened state.

When the carriage 16 that supported the object W and pulled and moved the traveling body 5 of the trolley conveyor 1 via the hanger 8 separated from this object W is led-in to the predetermined position on the elevating guide rails 29a by the carriage lead-in and sending-out means 31 of the object return means 15 and stops, next, as shown in FIG. 7, the cam rails 52a and 52b of the engagement device position switching means 35b on the elevating base 29b side are elevated to the elevation limits by the cylinder unit 54 to lift the cam follower rollers 39a and 39b entering into the cam rails 52a and 52b and tilt the seesaw moving bodies 37a and 37b against the urging forces of the springs 40a and 40b, whereby the pair of left and right engagement devices 34a and 34b are switched from the upper engaging positions to the lower disengaging positions to be disengaged downward from the engaged portions 42a and 42b of the pair of left and right hanger arms 10a and 10b of the hanger 8 (see FIG. 9B and FIG. 11B). In this state in which the hanger 8 is thus separated from the carriage 16, next, the pair of front and rear opening and closing gripping pieces 56a and 56b of the carriage feeder 32 on the elevating base 29b side are closed by the cylinder unit 66 of the opening and closing drive means 57 to grip the gripped portion 55 of the carriage 16 stopping immediately above, and then, the opening and closing gripping pieces 56a and 56b are moved forward by the predetermined distance s by the cylinder unit 63 of the moving drive means 58 of the carriage feeder 32. As a result, the carriage 16 moves forward by the predetermined distance s on the elevating guide rails 29a together with the object W that the carriage supports, and the object W supported by this carriage 16 moves forward by the predetermined distance s with respect to the hanger 8 in the traveling body 5 of the trolley conveyor 1 left stopped at the fixed stop position P3.

By the series of operations in the object return means 15, the relative positional relationship in the front and rear direction between the object W and the hanger 8 is restored to the state before the object is transferred from the hanger 8 of the traveling body 5 in the trolley conveyor 1 onto the carriage 16 of the carriage-type transportation device 11, that is, to the relative positional relationship in the front and rear direction between the hanger 8 and the object W during suspending transportation by the trolley conveyor 1. In this state, next, the opening and closing gripping pieces 56a and 56b of the carriage feeder 32 are opened to release the gripping of the gripped portion 55 of the carriage 16, and then, when the elevating base 29b (elevating guide rails 29a) is lowered from the elevation limit level H to the lowering limit level L by the elevating drive means 30 of the object return means 15, the object W supported by the object support devices 19 of the carriage 16 that lowers together with the elevating base is transferred onto the object supports 9c of the pair of left and right hanger arms 10a and 10b of the hanger 8 in the middle of lowering, and returned to the state supported by the hanger 8. On the other hand, the carriage 16 that became empty on the elevating guide rails 29a is sent-out from the position on the elevating guide rails 29a that has been turned into a state in which the elevating base 29b reaches the lowering limit level L and they are connected to the guide rails 17 of the carriage return route 13 of the carriage-type transportation device 11, to the inside of the carriage return route 13 by the carriage lead-in and sending-out means 31 on the elevating base 29b side and the friction drive means 21 on the carriage return route 13 side, and transported toward the object receiving means 14 on the carriage return route 13.

The traveling body 5 having the hanger 8, that is, the traveling body 5 of the trolley conveyor 1 stopping at the fixed stop position P3 is moved by an appropriate auxiliary feeder provided along the free line 2 to the end point position (start point position of the drive section D) P4 of the drive releasing section F in the trolley conveyor 1, and thereby, the traveling body is propelled again in the drive section D on the downstream side more than the drive releasing section F by the pusher that moves in the power line 3 of the trolley conveyor 1, whereby the object W separated from the carriage 16 according to lowering of the carriage 16 and returned onto the hanger 8 can be transported while being suspended. The relative positional relationship in the front and rear direction between the object W and the hanger 8 at this time is clearly the same as that before the object is transferred onto the carriage 16 of the carriage-type transportation device 11 at the entrance of the drive releasing section F. The fixed stop position P3 is set to a position within the drive section D on the downstream side of the drive releasing section F, and the driven dog 6 of the traveling body 5 stopped at this fixed stop position P3 is lowered by an appropriate operating means so as to prevent the pusher of the power line 3 in the drive section D from acting on the driven dog 6 of the traveling body 5 stopped at the fixed stop position P3, and the driven dog 6 that had been lowered at the time of completion of the returning action of the object W to the hanger 8 is returned to immediately propel the traveling body 5 by the pusher moving in the power line 3 of the trolley conveyor 1 from said fixed stop position P3, whereby the auxiliary feeder that moves the traveling body 5 from the fixed stop position P3 to a predetermined position may be omitted.

The present invention can be carried out by the above-described embodiments, however, when the work area Wa for the object W on the carriage 16 of the carriage-type transportation device 11 is at a position apart from the hanger 8 of the traveling body 5 of the trolley conveyor 1 that suspended and transported the object W, and at this position, a work for the work area Wa is not obstructed by the hanger 8, the means and process of moving relatively to each other in the front and rear direction the object W transferred onto the carriage 16 and the hanger 8 that supported the object W can be omitted.

INDUSTRIAL APPLICABILITY

The transportation facility of the present invention can be used as a transportation facility for vehicle bodies in an automobile assembly line for attaching various parts such as doors to the vehicle bodies.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. A transportation facility comprising an object suspending transportation device, a carriage-type transportation device, an object receiving means, and an object return means, where
   the object suspending transportation device comprises traveling bodies having object support hangers, and in a traveling route of the traveling bodies, a drive section in which the traveling bodies are forcibly made to travel and a drive releasing section in which the traveling bodies are made freely movable are provided,
   the carriage-type transportation device comprises a carriage capable of traveling along the traveling route at the under side of the drive releasing section of the traveling route of the traveling bodies, and on the carriage, object support devices are provided,
   the object receiving means is for transferring an object from the hanger onto the object support devices by lifting the object support devices relative to the hanger of the traveling body at the start point of transportation of the carriage-type transportation device, and
   the object return means is for transferring an object from the object support devices onto the hanger by lowering the object support devices relatively to the hanger of the traveling body at the end point of transportation of the carriage-type transportation device, wherein
   the object support hanger of the traveling body of the object suspending transportation device is provided with engaged portions,
   the carriage of the carriage-type transportation device is provided with a hanger engagement means capable of engaging with and disengaging from the engaged portions of the hanger, and
   in the transportation route of the carriage-type transportation device, the hanger engagement means engages with the engaged portions of the hanger and the carriage pulls and moves the traveling body of the object suspending transportation device switched into a drive releasing state via the hanger.

2. The transportation facility according to claim 1, wherein the object suspending transportation device comprises a trolley conveyor that propels the traveling body by a pusher moving along the traveling route of the traveling body, and
   in the drive releasing section of the traveling body, the pusher is separated from the traveling body and switched into a drive releasing state.

3. The transportation facility according to claim 1, wherein the object receiving means and the object return means are constituted by elevating bases which elevate and lower a carriage itself of the carriage-type transportation device.

4. The transportation facility according to claim 1, wherein the hanger engagement means is provided at positions corresponding to the engaged portions on the hanger side when the object support devices that received an object from the hanger and this hanger move relative to each other by a predetermined distance in the front and end direction at a start point of transportation of the carriage-type transportation device, and
   at an end point of transportation of the carriage-type transportation device, the object support devices supporting the object and the hanger are returned to the original relative positions in the front and rear direction, and then the object return means is operated.

5. The transportation facility according to claim 4, wherein the relative movements in the front and rear direction of the object support devices and the hanger at the start point and the end point of transportation of the carriage-type transportation device are made by movements in the front and rear direction of the carriage itself.

6. The transportation facility according to claim 5, wherein the carriage-type transportation device propels the carriage that cannot travel by itself by a carriage drive means provided on the transportation route side,
   the object receiving means is provided with a carriage sending-out means for sending-out the carriage toward the transportation route side, and a carriage feeder which moves the supported carriage in the front and rear direction to a position at which the hanger engagement means corresponds to the engaged portions of a hanger, and
   the object return means is provided with a carriage lead-in means for leading-in the carriage sent from the transportation route to a predetermined position, and a carriage feeder which returns the carriage in the front and rear direction so as to return the supported object and the hanger to the original relative positions in the front and rear direction.

7. The transportation facility according to claim 6, wherein the carriage feeder of the object receiving means and the object return means comprises a pair of front and rear opening and closing gripping pieces which grip a gripped portion provided on the carriage from the front and rear sides, an opening and closing drive means for the opening and closing gripping pieces, and a moving drive means which reciprocates the opening and closing gripping pieces in the front and rear direction.

8. The transportation facility according to claim 1, wherein
the hanger comprises a pair of left and right hanger arms, and
the hanger engagement means comprises a pair of left and right engagement devices capable of engaging with and disengaging from engaged portions provided on the respective left and right hanger arms, and one engagement device position switching means which makes the pair of left and right engagement devices to engage and disengage while interlocking these with each other.

9. The transportation facility according to claim 8, wherein
the pair of left and right engagement devices are urged and held by springs to upper positions at which the engagement devices engage with the engaged portions on the hanger side, and
the carriage is provided with cam follower rollers that elevate and lower by interlocking with the respective engagement devices, and
the engagement device position switching means comprises cam rails provided on the object receiving means and the object return means so as to engage with the cam follower rollers on the carriage side when the carriage is at the position of the object receiving means and the object return means, and a cam rail drive means which elevates and lowers the cam rails.

10. The transportation facility according to claim 9, wherein the pair of left and right engagement devices are provided on the outer ends of a pair of left and right seesaw moving bodies which are arranged sideways and have fulcrums at their middle points, and elevating bodies are interlocked with and joined to the inner ends of the seesaw moving bodies, and the cam follower rollers are axially supported on the lower ends of the elevating bodies.

11. The transportation facility according to claim 1, wherein
the hanger engagement means comprises engagement devices which can vertically engage with and disengage from the engaged portions provided on the hanger, an engagement position switching means which elevates and lowers the engagement devices, and a sensor,
the engagement devices comprise a pair of front and rear engaging portions for sandwiching the engaged portion, and of the pair of front and rear engaging portions, a rear engaging portion which pushes the engaged portion from the rear side is made movable in the front and rear direction in a predetermined range, and urged and held at a front side predetermined position by a spring, and
the sensor detects that the rear engaging portion moved rearward against the spring.

* * * * *

UNITED STATES PATENT AND TRADEMARK OFFICE
CERTIFICATE OF CORRECTION

PATENT NO. : 7,484,616 B2
APPLICATION NO. : 11/958470
DATED : February 3, 2009
INVENTOR(S) : Jiro Nakamura Page 1 of 1

It is certified that error appears in the above-identified patent and that said Letters Patent is hereby corrected as shown below:

Column 2, line 58, change "carriage (15) itself" to --carriage (16) itself--;

Column 8, line 29, change "driven dog 5" to --driven dog 6--;

Column 10, line 3, change "feeder 27" to --feeder 28--;

Column 12, line 17, change "conveyor L" to --conveyor 1--;

Column 13, line 20, change "carriage 15" to --carriage 16--;

Column 14, line 42, change "drive means 12" to --drive means 21--;

Column 15, line 25, change "guide rails 28a" to --guide rails 29a--.

Signed and Sealed this

Seventeenth Day of March, 2009

JOHN DOLL
*Acting Director of the United States Patent and Trademark Office*